United States Patent
Dandeu et al.

(10) Patent No.: US 9,447,334 B2
(45) Date of Patent: Sep. 20, 2016

(54) PROCESS FOR CONVERTING FEEDS DERIVED FROM RENEWABLE SOURCES WITH PRE-TREATMENT OF FEEDS BY HOT DEPHOSPHATATION

(75) Inventors: Aurelie Dandeu, Saint-Just Chaleyssin (FR); Vincent Coupard, Villeurbanne (FR); Thierry Chapus, Lyons (FR)

(73) Assignee: IFP Energies nouvelles, Rueil Malmaison (FR)

( * ) Notice: Subject to any disclaimer, the term of this patent is extended or adjusted under 35 U.S.C. 154(b) by 390 days.

(21) Appl. No.: 12/968,354

(22) Filed: Dec. 15, 2010

(65) Prior Publication Data

US 2011/0138680 A1 Jun. 16, 2011

(30) Foreign Application Priority Data

Dec. 16, 2009 (FR) .................... 09 06102

(51) Int. Cl.
*C10L 1/00* (2006.01)
*C10G 3/00* (2006.01)
*C11B 3/00* (2006.01)
*C11B 3/04* (2006.01)
*C11B 3/12* (2006.01)
*C11B 3/10* (2006.01)

(52) U.S. Cl.
CPC . *C10G 3/48* (2013.01); *C10G 3/46* (2013.01); *C10G 3/50* (2013.01); *C10G 3/54* (2013.01); *C11B 3/001* (2013.01); *C11B 3/04* (2013.01); *C11B 3/10* (2013.01); *C11B 3/12* (2013.01); *C10G 2300/1014* (2013.01); *C10G 2300/1018* (2013.01); *C10G 2300/205* (2013.01); *C10G 2300/4006* (2013.01); *C10G 2300/4012* (2013.01); *C10G 2300/4018* (2013.01); *C10G 2400/04* (2013.01); *Y02E 50/13* (2013.01); *Y02P 30/20* (2015.11)

(58) Field of Classification Search
CPC .............. C10G 2300/1014; C10G 2300/1018; C10G 2300/205; C10G 2300/4006; C10G 2300/4012; C10G 2300/4018; C10G 2400/04; C10G 3/50; C10G 3/54; C11B 3/001; C11B 3/04; C11B 3/10; C11B 3/12; Y02E 50/13; Y02P 30/20
USPC ........................................... 44/307; 585/733
See application file for complete search history.

(56) References Cited

U.S. PATENT DOCUMENTS

| 5,231,201 | A | 7/1993 | Welsh et al. |
| 7,250,106 | B2 * | 7/2007 | Benazzi et al. ............ 208/49 |
| 7,880,043 | B2 * | 2/2011 | Chapus .............. C10G 45/08 585/14 |
| 7,947,166 | B2 * | 5/2011 | Picard et al. ........... 208/208 R |
| 8,324,439 | B2 * | 12/2012 | Guillon et al. ............ 585/240 |
| 8,685,366 | B2 * | 4/2014 | Chaumonnot et al. ...... 423/701 |
| 2010/0077652 | A1 | 4/2010 | Gruber et al. |
| 2010/0215820 | A1 * | 8/2010 | Roa-Espinosa ............ 426/417 |
| 2010/0240942 | A1 * | 9/2010 | Daudin et al. ............ 585/733 |
| 2010/0292518 | A1 * | 11/2010 | Debuisschert et al. ...... 585/252 |

FOREIGN PATENT DOCUMENTS

| DE | 102006061604 A1 | 7/2008 |
| EP | 0185182 A1 | 6/1986 |
| EP | 0376406 A1 | 7/1990 |
| EP | 0376406 A1 * | 7/1990 |
| JP | 2009155475 A * | 7/2009 |
| WO | 2007098928 A1 | 9/2007 |
| WO | WO 2009004180 A2 * | 1/2009 |
| WO | WO2009/060143 * | 5/2009 |
| WO | WO 2009060143 A2 * | 5/2009 |

OTHER PUBLICATIONS

Institut National De La Propriete Industrielle. Search Report. FR0906102, Applicant: IFP, Mailed: Jul. 30, 2010.
European Patent Office. "English Abstract—Method for Producing Fatty Acid Alkyl Ester and/or Glyerol and its Production Apparatus." JP2009155475A, Applicant: Nippon Shokubai Co Ltd, Jul. 16, 2009.

* cited by examiner

Primary Examiner — Latosha Hines
(74) Attorney, Agent, or Firm — Millen White Zelano and Branigan, PC; John Sopp; Anthony Zelano

(57) ABSTRACT

The invention concerns a process for the pre-treatment of an unrefined vegetable or animal oil, consisting of passing said oil through a reactor comprising at least one fixed bed of at least one adsorbent comprising a porous refractory oxide which is free of catalytic metals, at a temperature in the range 130° C. to 320° C., at a pressure in the range 0.1 to 7 MPa and with a residence time for said oil on said fixed bed in the range 0.1 to 1 hour. The invention concerns a process for pre-treatment of a semi-refined vegetable or animal oil, integrated upstream of a hydrotreatment step for the production of green gas oil.

18 Claims, No Drawings

PROCESS FOR CONVERTING FEEDS DERIVED FROM RENEWABLE SOURCES WITH PRE-TREATMENT OF FEEDS BY HOT DEPHOSPHATATION

CROSS REFERENCE TO RELATED APPLICATIONS

This application is related to concurrently filed application entitled "METHOD OF PRODUCING ALKYL ESTERS FROM VEGETABLE OR ANIMAL OIL AND AN ALIPHATIC MONOALCOHOL WITH FIXED-BED HOT PURIFICATION" based on French priority application 09/06.097 by Aurélie DANDEU et al., filed Dec. 16, 2009, Ser. No. 12/968,643, incorporated by reference herein.

FIELD OF THE INVENTION

In an international context marked by a rapid increase in the need for fuels, in particular gas oil bases in the European community, a great deal is at stake in the search for novel sources of renewable energy which can be integrated into the traditional refining and fuel production scheme.

In this regard, interest in integrating novel products of vegetable origin derived from the conversion of lignocellulose biomass or derived from the production of vegetable oils or animal fats into the refining process has surged in recent years due to the increase in the cost of fossil substances. Similarly, traditional biofuels (principally ethanol or methyl esters of vegetable oils) have gained genuine status as complements to oil type fuels in fuel pools. Better use of such bioresources, such as their integration into the fuel pool, would thus be of definite advantage.

The high demand for gas oil fuels coupled with major environmental considerations increases the interest in using feeds derived from renewable sources. Examples of such feeds that may be cited are vegetable oils, animal fats, which are unrefined or have undergone a prior treatment, as well as mixtures of such feeds. Said feeds contain triglyceride type or ester or fatty acid type chemical structures, the structure and length of the hydrocarbon chain thereof being compatible with the hydrocarbons present in the gas oil bases which can be incorporated into the fuel pool.

The feeds derived from renewable sources used in the present invention are unrefined oils defined as being vegetable oils of terrestrial, aquatic or animal origin. They are primarily composed of triglycerides in an amount of 80-98% by weight. The minor compounds, i.e. present in an amount of 2% to 20% by weight, are free fatty acids, mono- and di-glycerides, glyceride oxide compounds derived from degradation of the oil, polymers, waxes (natural hydrocarbons present in the oil), proteins containing sulphur and/or nitrogen, phospholipids, tocopherols, sterols, natural colorants as well as odorizing compounds of greater or lesser volatility. Said unrefined oils also contain, as minor compounds, species containing heteroelements such as phosphorus, magnesium, calcium, iron or zinc in amounts which may be up to 2500 ppm, principally in the form of phospholipids and/or sterols in the case of phosphorus, magnesium and calcium or present in pigments for the particular case of magnesium and in the form of sterols and/or soaps in the case of iron and/or zinc (Oils and Fats Manual: A comprehensive treatise, Volume 1 page 90, Karleskind A et al).

One aim of the invention is to provide a process for the pre-treatment of crude oils allowing the elimination of heteroelements contained in the minor compounds such as phosphorus, magnesium, calcium, iron and/or zinc.

A further aim of the present invention is to provide a process for the production of distillate bases, gas oil and/or kerosene, from an unrefined or semi-refined vegetable or animal oil, comprising, upstream of a hydrotreatment step, a step for intense pre-treatment in order to eliminate the heteroelements contained in the minor compounds such as phosphorus, magnesium, calcium, iron and/or zinc, which are insoluble under the hydrotreatment conditions.

In order to be used as a source of biofuel, unrefined oil as defined hereinabove currently has to be pre-refined with the aim of eliminating the minor compounds, in particular at least a portion of the phospholipids and at least a portion of the free fatty acids. Pre-refining an unrefined oil generally includes:

- a step for degumming, consisting of eliminating at least a portion of the phospholipids or gums by precipitation in the presence of acidulated water;
- a step for neutralization, in the presence of a sodium hydroxide solution, of the degummed oil in order to neutralize at least a portion of the free fatty acids present in the oil. The neutralization pastes formed during this step entrain a portion of the impurities contained in the oil; and
- a step for washing with water to eliminate traces of sodium salts;
- and a vacuum drying step.

The oil at the end of pre-refining is known as semi-refined oil, also termed DND oils (degummed, neutralized and dried). In order to obtain an oil of food quality, or "refined oil", other operations such as decoloration and deodorizing are necessary. However, such operations cause a loss in oil yield.

One advantage of the present invention is thus to allow the use either of an unrefined vegetable or animal oil which has not undergone any pre-treatment, or a semi-refined vegetable or animal oil as defined hereinabove, in the process for the production of distillate bases of the invention.

In the case in which the feed of the process for the production of distillate bases of the invention is an unrefined vegetable or animal oil, the intense pre-treatment step placed upstream of a hydrotreatment step can eliminate the heteroelements contained in the minor compounds such as phosphorus, magnesium, calcium, iron and/or zinc, while minimizing the loss of oil yield compared with the conventional decolorizing and/or deodorizing process, and avoiding adding external solvent.

In the case in which the feed of the process for the production of distillate bases of the invention is a semi-refined vegetable or animal oil, at the end of said pre-refining said semi-refined oils still contain up to 20 ppm of phosphorus, calcium, magnesium, iron and/or zinc, in the form of phospholipids (Oils and Fats Manual: A comprehensive treatise, Volume 1 page 90, Karleskind A et al).

Under the temperature conditions for the vegetable oil hydrotreatment process, these species are transformed into a mixed calcium and magnesium phosphate of the type $Ca_xMg_y(PO_4)_z$, insoluble in the reaction medium. These solid species are then deposited in the catalytic bed and operation of the hydrotreatment reactor becomes difficult, with an increase in the pressure drop in the reactor and deactivation of the catalyst by pore plugging. The cycle time is reduced by the presence of these impurities.

Thus, it appears necessary to be able to control and limit the quantity of clogging insoluble species with the aim of improving the operability of industrial units.

In the case in which the feed for the process for the production of distillate bases of the invention is a semi-refined vegetable or animal oil, one advantage of the invention is thus to provide a process comprising, upstream of a hydrotreatment step, a step for intense pre-treatment which can eliminate these insoluble species by crystallization and/or hot precipitation then by adsorption, until a phosphorus, calcium, magnesium, iron and/or zinc content of less than 1.5 ppm, preferably less than 1 ppm, is obtained and then to improve the activity and service life of the catalyst placed downstream.

The Applicant has thus discovered that the use, for intense pre-treatment of an unrefined oil, of at least one fixed bed of at least one adsorbent comprising a porous refractory oxide which is free of catalytic metals selected from groups 6 and 8 to 12, at a temperature in the range 130° C. to 320° C., at a pressure in the range 0.1 to 7 MPa and with a residence time for said oil on said fixed bed in the range 0.1 to 1 hour, can considerably reduce the quantity of phosphorus, calcium, magnesium, iron and/or zinc in the oil at the end of the pre-treatment step, and in particular can produce an oil with a phosphorus, calcium, magnesium, iron and/or zinc content of less than 1.5 ppm, preferably less than 1 ppm.

The Applicant has also discovered that the use of said pre-treatment defined hereinabove in the case of the treatment of an unrefined or semi-refined vegetable or animal oil as defined hereinabove upstream of a hydrotreatment step can improve the activity and service life of a hydrotreatment catalyst by eliminating clogging insoluble species.

SUMMARY OF THE INVENTION

The present invention concerns a process for the pre-treatment of an unrefined vegetable or animal oil, consisting of passing said oil through a reactor comprising at least one fixed bed of at least one adsorbent comprising a porous refractory oxide which is free of catalytic metals selected from groups 6 and 8 to 12, at a temperature in the range 130° C. to 320° C., at a pressure in the range 0.1 to 7 MPa and with a residence time for said oil on said fixed bed in the range 0.1 to 1 hour.

The present invention also concerns a process for the production of gas oil and/or kerosene middle distillate bases from an unrefined or semi-refined vegetable or animal oil comprising:
  a) a pre-treatment step, consisting of passing said oil through a reactor comprising at least one fixed bed of at least one adsorbent comprising a porous refractory oxide which is free of catalytic metals selected from groups 6 and 8 to 12, at a temperature in the range 130° C. to 320° C., at a pressure in the range 1 to 10 MPa and with a residence time for said oil on said fixed bed in the range 0.1 to 1 hour;
  b) a step for hydrotreatment, in the presence of at least one fixed bed catalyst, of the pre-treated effluent from step a) at a temperature in the range 200° C. to 450° C., at a pressure in the range 1 MPa to 10 MPa, at an hourly space velocity in the range 0.1 $h^{-1}$ to 10 $h^{-1}$ and in the presence of a total quantity of hydrogen mixed with the feed such that the hydrogen/feed ratio is in the range 70 to 1000 $Nm^3$ of hydrogen/$m^3$ of feed;
  c) a step for separation, starting from the hydrotreated effluent derived from step b), of the hydrogen, the gases and at least one middle distillate base.

DESCRIPTION OF THE INVENTION

The present invention concerns a process for the pre-treatment of an unrefined vegetable or animal oil, consisting of passing said oil through a reactor comprising at least one fixed bed of at least one adsorbent comprising a porous refractory oxide which is free of catalytic metals selected from groups 6 and 8 to 12, at a temperature in the range 130° C. to 320° C., at a pressure in the range 0.1 to 7 MPa and with a residence time for said oil on said fixed bed in the range 0.1 to 1 hour.

The feed treated in the pre-treatment process of the invention is an unrefined vegetable oil of terrestrial, aquatic or animal origin the major portion of which is composed of triglycerides in an amount of 80-98% by weight. The minor compounds, i.e. present in an amount of 2% to 20% by weight, are free fatty acids, mono- and di-glycerides, glyceride oxide compounds derived from degradation of the oil, polymers, waxes (natural hydrocarbons present in the oil), proteins containing sulphur and/or nitrogen, phospholipids, tocopherols, sterols, natural colorants as well as odorizing compounds of greater or lesser volatility. Said unrefined oils also contain, as minor, compounds, species containing heteroelements such as phosphorus, magnesium, calcium, iron or zinc in amounts which may be up to 2500 ppm, principally in the form of phospholipids and/or sterols in the case of phosphorus, magnesium and calcium or present in pigments for the particular case of magnesium and in the form of sterols and/or soaps in the case of iron and/or zinc.

The unrefined vegetable oils are advantageously selected from customary vegetable oils of terrestrial or aquatic origin, such as palm kernel oils (solid or oleins), soya, palm nut, coprah, babassu, rapeseed (old or new), sunflower (conventional or oleic), corn, cotton, peanut oils, Barbados nut (Jatropha curcas), castor, linseed and crambe oil and any oil derived, for example, from sunflower or rape by, genetic modification or hybridization or from algae or from aquatic organisms or from partially modified oils, for example by polymerization or oligomerization, such as "stand oils" from linseed oil, sunflower oil and blown vegetable oils.

The unrefined animal oils are advantageously selected from animal fats, preferably from lard and fats composed of residues from the food industry or derived from the restaurant industry.

The oils used are advantageously neutral or acid, virgin or recycled.

The densities at 15° C. of said oils are advantageously in the range 850 to 970 kg/$m^3$ and their kinematic viscosities at 40° C. are between 20 and 400 $mm^2$/s, preferably in the range 30 to 50 $mm^2$/s.

Said feeds derived from renewable sources generally also include various impurities, in particular heteroatoms such as nitrogen and/or sulphur. The quantities of nitrogen and sulphur in feeds derived from renewable sources are generally in the range approximately 1 ppm to 100 ppm by weight, preferably less than 100 ppm, depending on their nature. They may be up to 1% by weight on particular feeds.

The pre-treatment process of the invention may also be carried out starting from a feed constituted by a semi-refined vegetable or animal oil, said pre-treatment step being in accordance with the invention, carried out upstream of a hydrotreatment step. Pre-refining the oil can eliminate minor compounds, in particular at least a portion of the phospholipids and at least a portion of the free fatty acids, said pre-refining of said unrefined oil comprising:
  a step for degumming, consisting of eliminating at least a portion of the phospholipids or gums by precipitation in the presence of acidulated water;
  a step for neutralization, in the presence of a sodium hydroxide solution, of the degummed oil in order to neutralize at least a portion of the free fatty acids present in the oil. The neutralization pastes formed during this step entrain a portion of the impurities contained in the oil; and a step for washing with water to eliminate traces of sodium salts;

and a vacuum drying step.

The oil obtained at the end of pre-refining is termed semi-refined, and is also termed DND oil.

In particular, the present invention concerns the preparation of gas oil and/or kerosene middle distillate fuel bases complying with new environmental standards, starting from said unrefined or semi-refined oils.

Thus, the present invention also concerns a process for the production of middle distillate bases from an unrefined or semi-refined vegetable or animal oil comprising:

a) a pre-treatment step, consisting of passing said oil through a reactor comprising at least one fixed bed of at least one adsorbent comprising a porous refractory oxide which is free of catalytic metals selected from groups 6 and 8 to 12, at a temperature in the range 130° C. to 320° C., at a pressure in the range 1 to 10 MPa and with a residence time for said oil on said fixed bed in the range 0.1 to 1 hour;

b) a step for hydrotreatment, in the presence of at least one fixed bed catalyst, of the pre-treated effluent from step a) at a temperature in the range 200° C. to 450° C., at a pressure in the range 1 MPa to 10 MPa, at an hourly space velocity in the range 0.1 $h^{-1}$ to 10 $h^{-1}$ and in the presence of a total quantity of hydrogen mixed with the feed such that the hydrogen/feed ratio is in the range 70 to 1000 $Nm^3$ of hydrogen/$m^3$ of feed;

c) a step for separation, starting from the hydrotreated effluent derived from step b), of the hydrogen, the gases and at least one gas oil base.

Pre-Treatment of Unrefined or Semi-Refined Oil

The pre-treatment process in the case of an unrefined vegetable or animal oil or the pre-treatment step a) of the process for the production of a gas oil base in accordance with the invention in the case of a semi-refined vegetable or animal oil will be described simultaneously.

Since the desired function during pre-treatment of the unrefined or semi-refined oil is solely a thermal transformation of the heteroelements to a mixed phosphate and immobilizing them by adsorption, rather than a catalytic function, the pre-treatment reactor comprises at least one fixed bed of an adsorbent material which is free of catalytic metals.

In accordance with the invention, the pre-treatment of said vegetable or animal oil, crude or semi-refined, consists of passing the oil through a reactor comprising at least one fixed bed of at least one adsorbent comprising a porous refractory oxide which is free of catalytic metals selected from groups 6 and 8 to 12, at a temperature in the range 130° C. to 320° C., preferably in the range 160° C. to 250° C. and more preferably in the range 160° C. to 220° C., at a pressure in the range 0.1 to 10 MPa, preferably in the range 0.3 to 1 MPa, and with a residence time for said oil on said fixed bed in the range 0.1 to 2 hours, preferably in the range 0.2 to 1.5 hours.

In accordance with the invention, the adsorbents used during pre-treatment are adsorbents comprising a porous refractory oxide which is free of catalytic metals selected from groups 6 and 8 to 12, said porous refractory oxide preferably being selected from alumina, optionally activated, and silica-alumina.

Highly preferably, said adsorbents are constituted by 100% of a porous refractory oxide preferably selected from alumina, optionally activated, and silica-alumina.

In accordance with the invention, the adsorbents are used in a fixed bed, also termed a guard bed, with the particular feature that said guard bed is used with a minimum temperature for activation of the desired thermal crystallization and/or the precipitation reaction.

The adsorbents used in the pre-treatment of the present invention are advantageously formed and are preferably spherical in shape, or oblong, cylindrical, hollow or solid extrudates, twisted cylinders, or multilobes, for example with a number of lobes in the range 2 to 5 or in the form of rings.

Preferably, the adsorbents are in the form or spheres or extrudates, with a diameter in the range 0.5 to 20 mm, preferably 0.5 to 10 mm; the spherical form is highly preferred.

Said adsorbents may advantageously have more particular geometrical shapes in order to increase their void fraction. The adsorbents may also advantageously have the following forms: hollow cylinders, hollow rings, Rashig rings, toothed hollow cylinders, crenelated hollow cylinders, cartwheels, Blend saddles, or multiple-hole cylinders.

The void fraction of said adsorbents is advantageously in the range 0.2 to 0.75, preferably in the range 0.35 to 0.5.

Their external diameter is advantageously in the range 1 to 35 mm.

Said adsorbents may advantageously be used alone or as a mixture. It is particularly advantageous to superimpose different adsorbents in at least two different fixed beds of varying height, the adsorbents having the highest void fraction preferably being used in the first fixed bed or beds, at the inlet to the pre-treatment reactor.

Preferred adsorbents are advantageously adsorbents with a macroporosity.

Preferably, said macroporous adsorbents have a macroporous volume measured by mercury intrusion, i.e. a volume of pores with a mean diameter of 500 Å, of more than 0.1 ml/g, and preferably in the range 0.125 to 0.4 ml/g. Said adsorbents also advantageously have a total pore volume of more than 0.60 ml/g, preferably in the range 0.625 to 1.5 ml/g, and a specific surface area, expressed as the $S_{BET}$, which is advantageously in the range 30 $m^2$/g to 320 $m^2$/g.

A highly preferred adsorbent is a macroporous alumina sold by Axens with catalogue reference number ACT 139.

During said pre-treatment of the unrefined or semi-refined oil, after heating under the correct temperature conditions, precipitation of a solid comprising the impurities based on phosphorus, calcium, magnesium, iron and/or zinc is observed.

The solid impurities will then be deposited on the fixed bed of adsorbent, also termed the guard bed, with the particular feature that said guard bed is used with a minimum activation temperature of the desired thermal crystallization and/or precipitation reaction.

In accordance with a preferred implementation of the pre-treatment of the present invention, said pre-treatment is carried out in a reactor comprising several fixed beds placed in parallel, and which can be switched. Thus, it is possible to remove one of the guard beds for cleaning purposes when the adsorbent or adsorbents constituting it is/are saturated with solid impurities.

Several options can be envisaged for the phase for cleaning the saturated guard bed or fixed bed.

In one embodiment, the saturated guard bed can be removed from the pre-treatment reactor. In this case, the liquid is advantageously emptied out, followed by the solid and that portion of the reactor is cleaned. Recharging may advantageously be carried out with a fresh charge of adsorbent, or with the cleaned old charge, for example cleaned using a solvent or regenerated by burning, before replacing that portion of the reactor in the pre-treatment reactor.

In a second embodiment, cleaning of the saturated bed of adsorbents can advantageously be carried out by on-line rinsing with a co- or counter-current solvent to detach and/or dissolve the particles present. The solvent is advantageously a polar or non-polar light hydrocarbon, and is advantageously selected from methanol, pentane, ethanol, heptane or hexane. After separation, at the reactor outlet, of the extracted solid and the extraction solvent, the solvent is advantageously recycled to the reactor to continue the extraction.

In a third embodiment, the phase for cleaning the saturated guard bed with solid impurities is advantageously carried out by in situ burning.

In the case in which the pre-treatment of the invention is carried out in a fixed switchable bed of at least one adsorbent, switching is advantageously carried out when the phosphorus content in the oil after said pre-treatment is more than 2 ppm.

Thus, because of the pre-treatment of the invention, the quantity of phosphorus, an indicator of the heteroelement content of the oil after pre-treatment, is less than 1.5 ppm, preferably less than 1 ppm. The phosphorus acts as a tracer as it is present in the compounds which are the most difficult to remove. As a consequence, the quantity of calcium, magnesium, iron and/or zinc is less than 1.5 ppm and preferably less than 1 ppm.

The quantity of phosphorus, calcium, magnesium, iron and/or zinc is determined by inductively coupled plasma atomic emission spectroscopy (ICP-OES), for example using the method described in European standard EN 14 241, i.e. with a given sensitivity for these elements of 1 ppm.

In the case in which said pre-treatment is placed upstream of a hydrotreatment step and constitutes step a) of a process for producing gas oil and/or kerosene middle distillates from an unrefined or semi-refined vegetable or animal oil, the pre-treated effluent derived from step a) constitutes the feed for hydrotreatment step b).

Step b): Hydrotreatment of Pre-Treated Feed

In step b) of the process of the invention, the pre-treated effluent derived from step a) and containing less than 1 ppm of phosphorus, calcium, magnesium, iron and/or zinc, is brought into contact with at least one fixed bed of catalyst at a temperature in the range 200° C. to 450° C., preferably in the range 220° C. to 350° C., more preferably in the range 220° C. to 320° C., and still more preferably in the range 220° C. to 310° C. The pressure is in the range 1 MPa to 10 MPa, preferably in the range 1 MPa to 6 MPa and still more preferably in the range 1 MPa to 4 MPa. The hourly space velocity is in the range $0.1\ h^{-1}$ to $10\ h^{-1}$. The feed is brought into contact with the catalyst in the presence of hydrogen. The total quantity of hydrogen mixed with the feed is such that the hydrogen/feed ratio is in the range 70 to 1000 $Nm^3$ of hydrogen/$m^3$ of feed, more preferably in the range 150 to 750 $Nm^3$ of hydrogen/$m^3$ of feed.

The hydrogen may advantageously come from a makeup of hydrogen and/or from recycling hydrogen-rich gas derived from separation step c), said hydrogen-rich gas having previously undergone one or more intermediate purification treatments before being recycled and mixed with a portion of the pre-treated effluent derived from step a).

In step b) of the process for the production of gas oil bases in accordance with the invention, the fixed bed catalyst is advantageously a hydrotreatment catalyst comprising a hydro dehydrogenating function comprising at least one metal from group VIII and/or group VIB, used alone or as a mixture, and a support selected from the group formed by alumina, silica, silica-aluminas, magnesia, clays and mixtures of at least two of these minerals. This support may also advantageously include other compounds, for example oxides selected from the group formed by boron oxide, zirconia, titanium oxide and phosphoric anhydride. The preferred support is an alumina support, highly preferably η, δ or γ alumina.

Said catalyst is advantageously a catalyst comprising metals from group VIII, preferably selected from nickel and cobalt, used alone or as a mixture, preferably in association with at least one metal from group VIB, preferably selected from molybdenum and tungsten, used alone or as a mixture.

The quantity of oxides of metals from group VIII, preferably nickel oxide, is advantageously in the range 0.5% to 10% by weight of nickel oxide (NiO), preferably in the range 1% to 5% by weight of nickel oxide, and the quantity of oxides of metals from group VIB, preferably molybdenum trioxide, is advantageously in the range 1% to 30% by weight of molybdenum oxide ($MoO_3$), preferably 5% to 25% by, weight, the percentages being expressed as a % by weight with respect to the total catalyst mass.

The total quantity of oxides of metals from groups VIB and VIII in the catalyst used in step a) is advantageously in the range 5% to 40% by weight, preferably in the range 6% to 30% by weight with respect to the total catalyst mass.

The weight ratio, expressed as the metal oxide, between the metal (or metals) from group VIB and the metal (or metals) from group VIII is advantageously in the range 20 to 1, preferably in the range 10 to 2.

Said catalyst used in step b) of the process of the invention should advantageously be characterized by a strong hydrogenating power in order to orientate the selectivity of the reaction as much as possible towards hydrogenation, conserving the number of carbon atoms of the fatty chains, i.e. the hydrodeoxygenation pathway, in order to maximize the yield of hydrocarbons falling within the distillation range for gas oils and/or kerosenes. For this reason, the operating temperature is preferably relatively low. Maximizing the hydrogenation also allows polymerization and/or condensation reactions leading to the formation of coke, which would degrade the stability of the catalytic performances, to be limited. Preferably, a Ni or NiMo type catalyst is used.

Said catalyst used in hydrotreatment step b) of the process of the invention may also advantageously contain a doping element selected from phosphorus and boron, used alone or as a mixture. Said doping element may be introduced into the matrix or, as is preferable, it may be deposited on the support. It is also possible to deposit silicon on the support, alone or with phosphorus and/or boron and/or fluorine.

The quantity by weight of the oxide of said doping element is advantageously less than 20% and preferably less than 10%; it is advantageously at least 0.001% with respect to the total catalyst mass.

The metals of the catalysts used in hydrotreatment step b) of the process of the invention are sulphided metals or metallic phases, preferably sulphided metals.

The scope of the present invention encompasses, in hydrotreatment step b) of the process of the invention, the simultaneous or successive use of a single catalyst or several different catalysts. This step may be carried out on an industrial scale in one or more reactors with one or more catalytic beds, preferably with a liquid downflow.

Step c): Separation of Hydrotreated Effluent Derived from Step b)

In accordance with step c) of the process of the invention, at least a portion, preferably all, of the hydrotreated effluent derived from step b) undergoes one or more separations. The aim of this step is to separate the gases from the liquid, and in particular to recover hydrogen-rich gases which may also contain gases such as CO and $CO_2$ and at least one liquid hydrocarbon gas oil base with a sulphur content of less than 10 ppm by weight. Separation is carried out using any of the separation methods known to the skilled person. The separation step may advantageously be carried out using any method known to the skilled person such as, for example, a combination of one or more high and/or low pressure separators, and/or distillation steps and/or high and/or low pressure stripping steps.

At least a portion of any water formed during hydrotreatment step b) of the process of the invention may also advantageously be separated from the liquid hydrocarbon gas oil base. The separation step c) may thus advantageously be followed by an optional step for eliminating at least a portion of the water, preferably all of the water.

The optional water removal step is intended to eliminate at least a portion of the water produced during the hydrotreatment reactions. The term "water elimination" means elimination of the water produced by the hydride-oxygenation (HDO) reactions which take place during hydrotreatment step b). The degree to which the water is eliminated may be a function of the tolerance of the hydroisomerization catalyst used in the last step c) of the process of the invention to water. The water may be eliminated using any of the methods and techniques known to the skilled person, for example drying, passage over a dessicant, flash, decanting, etc.

The liquid hydrocarbon gas oil and/or kerosene middle distillates base is essentially constituted by n-paraffins which may be incorporated into the gas oil and/or kerosene pool. In order to improve the cold properties of said liquid hydrocarbon gas oil base, a hydroisomerization step may advantageously be carried out to transform the n-paraffins into branched paraffins with better cold properties.

The hydroisomerization step is advantageously carried out in a separate reactor, under operating and catalytic conditions which are known to the skilled person.

Gas Treatment and Recycling

The hydrogen-rich gas stream may advantageously come from a makeup of hydrogen and/or from recycling the gaseous effluent derived from separation step c), the gaseous effluent containing hydrogen-rich gas having previously undergone one or more intermediate purification treatments, preferably at least one wash with at least one amine before being recycled and mixed with the feed constituted by the semi-refined vegetable or animal oil from step a) and/or a portion of the pre-treated effluent derived from step a) and constituting the feed for hydrotreatment step b).

At least a portion of the makeup and/or recycle hydrogen may advantageously be added into pre-treatment step a) with the aim of fluidizing the flow of said feed constituted by a semi-refined vegetable or animal oil.

The recycle hydrogen may advantageously be introduced with the pre-treated effluent entering hydrotreatment step b) in the form of a quenching hydrogen, between the beds of hydrotreatment catalysts.

It is also advantageous to add to the recycle gas a certain quantity of a sulphur-containing compound (such as DMDS, dimethyldisulphide), which thermally decomposes to produce hydrogen sulphide, $H_2S$. This device can if necessary maintain the catalyst in hydrotreatment step b) in the sulphurized state. Advantageously, the quantity of sulphur-containing compound introduced is such that the quantity of $H_2S$ in the recycle gas is at least 15 ppm by volume, preferably at least 0.1% by weight, or even at least 0.2% by volume.

In another aspect, the invention consists of carrying out said pre-treatment of the invention upstream of other processes, for example by employing a concatenation comprising a first pre-treatment step as described in the invention followed by a second catalytic cracking step as described in patent application WO2007/090884, wherein the operating conditions and the catalysts used in said catalytic cracking step are employed using methods which are known to the skilled person in order to maximize the yield of middle distillates.

The intense pre-treatment of the invention of an unrefined oil can considerably reduce the quantity of phosphorus, calcium, magnesium, iron and/or zinc of said oil at the end of said pre-treatment and in particular can obtain a pre-treated oil wherein the quantity of phosphorus, calcium, magnesium, iron and/or zinc is less than 1.5 ppm, preferably less than 1 ppm.

In the case of the treatment of an unrefined or semi-refined vegetable or animal oil, carrying out a pre-treatment step as defined hereinabove upstream of a hydrotreatment step can, by eliminating clogging insoluble species from the feed to be hydrotreated, improve the activity and the service life of the hydrotreatment catalyst.

The following examples illustrate the invention without limiting the scope thereby.

EXAMPLES

Examples 1 and 2 were implemented in a fixed bed reactor traversed by an unrefined rapeseed oil pre-treated under different conditions. They allowed the impact of the operating conditions of the invention on the efficiency of said unrefined oil pre-treatment to be compared. The oil used in these two examples was unrefined rapeseed oil, the overall composition of which is given in Tables 1 and 2. However, any other unrefined oil of vegetable origin could produce analogous results.

TABLE 1

Overall composition of unrefined rapeseed oil

| Fatty acid glyceride | Nature of fatty chain | % by weight |
|---|---|---|
| Myristic | C14:0 | 0.1 |
| Palmitic | C16:0 | 5 |
| Palmitoleic | C16:1 | <0.5 |
| Stearic | C18:0 | 2 |
| Oleic | C18:1 | 59 |
| Linoleic | C18:2 | 21 |
| Linolenic | C18:3 | 9 |
| Arachidic | C20:0 | <0.5 |
| Gadoleic | C20:1 | 1 |
| Behenic | C22:0 | <0.5 |
| Erucic | C22:1 | <1 |
| Lignoceric | C24:0 | <1 |

| Analysis of phospholipids | | ppm |
|---|---|---|
| Phosphatidylethanolamine | (PE) | 16.8 |
| Phosphatidylcholine | (PC) | 21.9 |
| Sphingomyelin | (SM) | <0.1 |
| Lysophosphatidylcholine | (LPC) | <0.1 |
| Lysophosphatidylethanolamine | (LPE) | <0.1 |
| Phosphatidic acid | (PA) | 61.3 |
| Phosphatidylserine | (PS) | <0.1 |

The quantity of phosphorus, calcium and magnesium in the unrefined oil is given in Table 2. The quantity of phosphorus, calcium, magnesium and iron was determined by inductively coupled plasma atomic emission spectroscopy (ICP-OES) using the method described in European standard EN 14 241, i.e. with a given sensitivity for these elements of 1 ppm.

TABLE 2

Composition of P, Ca, Mg of unrefined rapeseed oil

| Species | Content, ppm |
|---|---|
| P | 101 |
| Ca | 86 |
| Mg | 14 |
| Fe | 1 |

Overall composition of unrefined rapeseed oil

| | Content, wt % |
|---|---|
| Triglycerides | 97.2 |
| Diglycerides + sterols | 0.2 |
| Esterified sterols | 1.8 |
| Free sterols + others, including phospholipids | 0.8 |

The acid number of the unrefined rapeseed oil, determined using the EN 14104 method, was equal to 1.2 mg KOH/g oil. Said acid number is proportional to the number of fatty acids present in the unrefined oil.

The unrefined oil was pre-treated in a pre-treatment reactor with a volume of 3.6 L fully charged with a fixed bed of adsorbent constituted by spherical alumina with a diameter in the range 3 to 6 mm.

The alumina has a macroporous volume, measured by mercury intrusion, i.e. a volume of pores with a mean diameter of 500 Å, equal to 0.35 ml/g, a total pore volume equal to 1.2 ml/g and a specific surface area, expressed as $S_{BET}$, equal to 140 m$^2$/g.

In the following two examples, only the temperature was changed.

Example 1

Not in Accordance with the Invention

In Example 1, the operating conditions were 120° C., 0.7 MPa, and a residence time equal to 1 hour.

At the reactor outlet, the fatty acid composition was unchanged (see Table 1). In contrast, the quantity of phosphorus, calcium and magnesium and iron is given in Table 3. Under these operating conditions, purification was incomplete.

TABLE 3

P, Ca, Mg, Fe composition of rapeseed oil after pre-treatment at 120° C.

| Species | Content, ppm |
|---|---|
| P | 18 ppm |
| Ca | 15 ppm |
| Mg | 2 ppm |
| Fe | <1 ppm |

Example 2

In Accordance with the Invention

In Example 2, the operating conditions were 180° C., 0.7 MPa, and with a residence time equal to 1 hour.

At the outlet from this reactor, the fatty acid composition was unchanged (see Table 1). In contrast, the quantity of phosphorus, calcium, magnesium and iron is given in Table 4.

TABLE 4

P, Ca, Mg, Fecomposition of unrefined rapeseed oil after pre-treatment at 180° C.

| Species | Content, ppm |
|---|---|
| P | <1 ppm |
| Ca | <1 ppm |
| Mg | <1 ppm |
| Fe | <1 ppm |

The detection limit for the analytical apparatus did not allow an exact quantification of the compounds. Furthermore, in the examples, the quantity of Fe, determined by ICP, was below the quantification limit (<1 ppm) both for the feed and for the effluent. However, the pre-treatment was indeed effective as regards the capture of iron, as shown by the SEM-EDX analysis carried out on the adsorbent mass after the test. Qualitative analysis showed the presence of zones rich in elemental iron not associated with a counter-ion, showing that it was not a corrosion residue.

However, the results show that the intense pre-treatment of the invention of an unrefined oil can considerably reduce the quantity of phosphorus, calcium, magnesium and iron in said oil at the end of said pre-treatment, and in particular can obtain a pre-treated oil with a phosphorus, calcium, magnesium and iron content of less than 1 ppm.

Examples 3 and 4 were carried out in a fixed bed reactor traversed by an unrefined rapeseed oil with the fatty acid composition given in Table 1 and the P, Ca, Mg, Fe contents given in Table 2.

Example 3

In Accordance with the Invention

In Example 3 in accordance with the invention, said oil was pre-treated in a step a) under the conditions of Example 2, then the pre-treated effluent derived from step a) (explained in Example 2) was hydrotreated to produce a middle distillates base.

The phosphorus, magnesium and calcium content of the unrefined oil pre-treated in accordance with Example 2 is given in Table 3.

The pre-treated unrefined rapeseed oil then underwent a hydrotreatment step in the presence of 190 mL of hydrotreatment catalyst based on nickel and molybdenum, having a nickel oxide content equal to 3% by weight, a molybdenum oxide content equal to 16% by weight and a $P_2O_5$ content equal to 6%; the catalyst had previously been sulphurized.

700 Nm$^3$ of hydrogen/m$^3$ of feed was introduced into the reactor, maintained at a temperature of 300° C. and at a pressure of 5 MPa. The space velocity was adjusted in order to satisfy the ratio HSV=volume flow rate of feed/volume of catalyst=1 h$^{-1}$.

The degree of conversion is directly correlated with the density. The higher the density, the lower the conversion of the feed. The feed and effluent densities produced are respectively recorded in Table 5.

TABLE 5

Change in the density of the effluents obtained by hydrotreatment of pre-treated unrefined rapeseed oil, and in the temperature (P = 50 bar, HSV = 1 h⁻¹, H₂/feed = 700 L/L)

|  | Period of operation (h) | Density |
|---|---|---|
| Feed | 0 | 0.9199 |
| T, ° C. | | |
| 280 | 640 | 0.8047 |
| 300 | 750 | 0.7913 |

Table 5 shows that the activity was stable for each temperature. No differential overpressure, i.e. no clogging, was observed during the hydrotreatment step for more than 600 h.

Example 4

Not in Accordance with the Invention

In Example 4, the unrefined rapeseed oil underwent direct hydrotreatment with no prior pre-treatment step, in the presence of 190 mL of hydrotreatment catalyst based on nickel and molybdenum, having a nickel oxide content equal to 3% by weight, a molybdenum oxide content equal to 16% by weight and a $P_2O_5$ content equal to 6%, the catalyst having previously been sulphurized.

The space velocity was adjusted in order to comply with the ratio HSV=volume flow rate of feed/volume of catalyst=1 h⁻¹.

The degree of conversion is directly correlated with density. The higher the density, the lower the conversion of the feed. The feed and effluent densities respectively produced are recorded in Table 6.

TABLE 6

Change in the density of the effluents obtained by hydrotreatment of non-pre-treated unrefined rapeseed oil, and in the temperature (P = 50 bar, HSV = 1 h⁻¹, H₂/feed = 700 L/L)
Unrefined rapeseed oil

|  | Period of operation (h) | Density |
|---|---|---|
| Feed | 0 | 0.9224 |
| T, ° C. | | |
| 280 | 100 | 0.7961 |
| 300 | 113 | 0.7936 (start of stage) |
|  | 185 | 0.8265 |
|  | 209 | 0.8669 (end of stage) |
| 350 | 257 | 0.8912 |

Firstly, we observed that the density of the unrefined rapeseed oil was higher than the pre-treated rapeseed oil of Example 2 (pre-treated oil: 0.9199; unrefined: 0.9224). The density of the effluents produced by hydrotreatment of the unrefined oil indicates a conversion which was entirely equivalent at 300° C. (pre-treated: 0.7913; unrefined: 0.7961), demonstrating that the activity of the HR548 catalyst was very good irrespective of the degree of refining of the rapeseed oil after about a hundred hours of operation. However, we then observed a substantial increase in the density until a value of 0.8669 was reached after 200 hours, indicating a degradation in the degree of conversion of the feed and thus a progressive deactivation of the catalyst.

In view of these results, it was elected to continue the test at a temperature of 350° C. However, the degrees of conversion were further degraded (density of 0.8912). The operating capability of the unit became difficult under these conditions, with the appearance of an overpressure in the reactor, and so the test was finally stopped after only 260 hours of operation.

Deactivation of the catalyst during transformation of the unrefined rapeseed oil resulted in a substantial increase in the density of the effluents produced and was accompanied by an increase in the overpressure in the reactor. After discharging, a large quantity of solid residue was observed all along the reactor.

Pre-treatment of the oil as defined in Example 3 meant that the catalytic activity was stable, higher, and the operating capability of the reactor was better.

Without further elaboration, it is believed that one skilled, in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding FR application No 09/06.102, filed Dec. 16, 2009, FR application No. 09/06.097, filed Dec. 16, 2009, and FR application No. 09/06.097, filed Dec. 16, 2009 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:
1. A process for the production of middle distillate bases, comprising:
   a) pre-treating of a semi-refined vegetable or animal oil, comprising passing said oil through a reactor comprising at least one fixed bed of at least one adsorbent comprising 100% porous refractory oxide that is optionally activated alumina, or silica-alumina, which porous refractory oxide is free of catalytic metals from group 6 and groups 8 to 12, at a temperature in the range of 130° C. to 320° C., at a pressure in the range of 0.1 to 7 MPa and with a residence time for said oil on said fixed bed in the range of 0.1 to 1 hour; said adsorbent having a macroporous volume, measured by mercury intrusion, of pores with a mean diameter of 500 Å of more than 0.1 ml/g, a total pore volume of more than 0.60 ml/g, and a specific surface area, expressed as the SBET, of 30 m2/g to 320 m2/g,
   b) hydrotreating, in the presence of at least one fixed bed catalyst, of the pre-treated effluent from a) at a temperature in the range 200° C. to 450° C., at a pressure in the range 1 MPa to 10 MPa, at an hourly space velocity in the range 0.1 h⁻¹ to 10 h⁻¹ and in the presence of a total quantity of hydrogen mixed with the feed such that the hydrogen/feed ratio is in the range 70 to 1000 Nm³ of hydrogen/m³ of feed;
   c) separating from the hydrotreated effluent derived from b), of the hydrogen, the gases and at least one middle distillate base, in which said semi-refined vegetable or animal oil is obtained by pre-refining an unrefined vegetable or animal oil before the pre-treatment process, the pre-refining comprising:
  degumming, comprising eliminating at least a portion of the phospholipids or gums by precipitation in the presence of acidulated water;
  neutralizing, in the presence of a sodium hydroxide solution, of the degummed oil in order to neutralize at least a portion of the free fatty acids present in the oil;
  washing with water to eliminate traces of sodium salts; and
  vacuum drying.

2. A process in accordance with claim 1, in which the unrefined vegetable or animal oil subject to the pre-refining comprises 95-98% by weight of triglycerides and 2% to 5% by weight of free fatty acids, mono- and di-glycerides, and any of phospholipids, tocopherols, sterols, natural colorants as well as odorizing compounds and compounds of phosphorus, magnesium, calcium, iron and/or zinc in quantities of up to 2500 ppm, in the form of phospholipids and/or sterols in the case of phosphorus, magnesium and calcium or present in pigments in the case of magnesium and in the form of sterols and/or soaps in the case of iron and/or zinc.

3. A process for producing middle distillate bases in accordance with claim 1, in which said adsorbents have a spherical or extruded shape, with a diameter in the range 0.5 to 10 mm.

4. A process for producing middle distillate bases in accordance with claim 1, in which said pre-treatment is carried out at a temperature in the range 160° C. to 250° C., at a pressure in the range 0.3 to 1 MPa and with a residence time in the range 0.2 to 1.5 hours.

5. A process for producing middle distillate bases in accordance with claim 1, in which said pre-treatment is carried out in a reactor comprising several fixed beds placed in parallel, and which can be switched.

6. A process for producing middle distillate bases in accordance with claim 1, in which the fixed bed catalyst used in hydrotreatment step b) is a hydrotreatment catalyst comprising a hydrodehydrogenating function comprising at least one metal from group VIII and/or group VIB, used alone or as a mixture, and a support selected from the group formed by alumina, silica, silica-aluminas, magnesia, clays and mixtures of at least two of said minerals.

7. The process of claim 1, wherein the fixed bed catalyst for the hydrotreating step b) comprises at least one metal from Group VIII or Group IVB or at least one metal from each of Group VIII and Group IVB.

8. The process of claim 1, wherein the fixed bed catalyst for the hydrotreating step b) comprises at least one metal selected from nickel and cobalt and at least one metal selected from molybdenum and tungsten.

9. The process of claim 1, wherein the fixed bed catalyst for the hydrotreating step b) comprises a nickel oxide content in the range 0.5% to 10% by weight and a molybdenum trioxide content in the range 1% to 30% by weight, the percentages being expressed as a % by weight with respect to the total catalyst mass.

10. A process for the production of middle distillate bases, comprising:
  a) pre-treating of an unrefined vegetable or animal oil, comprising passing said oil through a reactor comprising at least one fixed bed of at least one adsorbent comprising 100% porous refractory oxide that is optionally activated alumina, or silica-alumina, which porous refractory oxide is free of catalytic metals from group 6 and groups 8 to 12, at a temperature in the range of 130° C. to 320° C., at a pressure in the range of 0.1 to 7 MPa and with a residence time for said oil on said fixed bed in the range of 0.1 to 2 hours; said adsorbent having a macroporous volume, measured by mercury intrusion, of pores with a mean diameter of 500 Å of more than 0.1 ml/g, a total pore volume of more than 0.60 ml/g, and a specific surface area, expressed as the SBET, of 30 m2/g to 320 m2/g,
  b) hydrotreating, in the presence of at least one fixed bed catalyst, of the pre-treated effluent from a) at a temperature in the range 200° C. to 450° C., at a pressure in the range 1 MPa to 10 MPa, at an hourly space velocity in the range 0.1 $h^{-1}$ to 10 $h^{-1}$ and in the presence of a total quantity of hydrogen mixed with the feed such that the hydrogen/feed ratio is in the range 70 to 1000 $Nm^3$ of hydrogen/$m^3$ of feed;
  c) separating from the hydrotreated effluent derived from b), of the hydrogen, the gases and at least one middle distillate base.

11. A process in accordance with claim 10, in which the unrefined vegetable or animal oil comprises 95-98% by weight of triglycerides and 2% to 5% by weight of free fatty acids, mono- and di-glycerides, and any of phospholipids, tocopherols, sterols, natural colorants as well as odorizing compounds and compounds of phosphorus, magnesium, calcium, iron and/or zinc in quantities of up to 2500 ppm, in the form of phospholipids and/or sterols in the case of phosphorus, magnesium and calcium or present in pigments in the case of magnesium and in the form of sterols and/or soaps in the case of iron and/or zinc.

12. A process for producing middle distillate bases in accordance with claim 10, in which said adsorbents have a spherical or extruded shape, with a diameter in the range 0.5 to 10 mm.

13. A process for producing middle distillate bases in accordance with claim 10, in which said pre-treatment is carried out at a temperature in the range 160° C. to 250° C., at a pressure in the range 0.3 to 1 MPa and with a residence time in the range 0.2 to 1.5 hours.

14. A process for producing middle distillate bases in accordance with claim 10, in which said pre-treatment is carried out in a reactor comprising several fixed beds placed in parallel, and which can be switched.

15. A process for producing middle distillate bases in accordance with claim 10, in which the fixed bed catalyst used in hydrotreatment step b) is a hydrotreatment catalyst comprising a hydrodehydrogenating function comprising at least one metal from group VIII and/or group VIB, used alone or as a mixture, and a support selected from the group formed by alumina, silica, silica-aluminas, magnesia, clays and mixtures of at least two of said minerals.

16. The process of claim 10, wherein the fixed bed catalyst for the hydrotreating step b) comprises at least one metal from Group VIII or Group IVB or at least one metal from each of Group VIII and Group IVB.

17. The process of claim 10, wherein the fixed bed catalyst for the hydrotreating step b) comprises at least one metal selected from nickel and cobalt and at least one metal selected from molybdenum and tungsten.

18. The process of claim 10, wherein the fixed bed catalyst for the hydrotreating step b) comprises a nickel oxide content in the range 0.5% to 10% by weight and a molybdenum trioxide content in the range 1% to 30% by weight, the percentages being expressed as a % by weight with respect to the total catalyst mass.

\* \* \* \* \*